United States Patent [19]

Fisher et al.

[11] Patent Number: 6,026,479
[45] Date of Patent: Feb. 15, 2000

[54] APPARATUS AND METHOD FOR EFFICIENT SWITCHING OF CPU MODE BETWEEN REGIONS OF HIGH INSTRUCTION LEVEL PARALLISM AND LOW INSTRUCTION LEVEL PARALLISM IN COMPUTER PROGRAMS

[75] Inventors: Joseph A. Fisher, Brookline; Paolo Faraboschi, Cambridge, both of Mass.; Paul G. Emerson, San Jose; Prasad A. Raje, Fremont, both of Calif.

[73] Assignee: Hewlett-Packard Company, Palo Alto, Calif.

[21] Appl. No.: 09/064,701

[22] Filed: Apr. 22, 1998

[51] Int. Cl.[7] ...................................................... G06F 9/38
[52] U.S. Cl. ............................................. 712/24; 712/215
[58] Field of Search .............................. 712/24, 212, 215, 712/203

[56] References Cited

U.S. PATENT DOCUMENTS

| | | | |
|---|---|---|---|
| 5,442,760 | 8/1995 | Rustad | 712/24 |
| 5,457,790 | 10/1995 | Iwamura | 711/167 |
| 5,461,715 | 10/1995 | Matsuo | 712/24 |
| 5,553,276 | 9/1996 | Dean | 713/500 |
| 5,774,686 | 6/1998 | Hammond | 712/209 |
| 5,784,630 | 7/1998 | Saito | 712/30 |
| 5,850,632 | 12/1998 | Robertson | 711/170 |
| 5,860,158 | 1/1999 | Pai | 711/118 |
| 5,881,296 | 3/1999 | Williams | 395/736 |

OTHER PUBLICATIONS

Joseph A. Fisher, Paolo Faraboschi and Giuseppe Desoli; Hewlett–Packard Laboratories Cambridge, 1 Maine Street, Cambridge, MA 02142; "Custom–Fit Processors: Letting Applications Define Architectures"; 29th Annual IEEE/ACM International Symposium on Microarchitecture; Dec. 2–4, 1996, Paris, France.

*Primary Examiner*—Eric Coleman

[57] ABSTRACT

A CPU having a cluster VLIW architecture is shown which operates in both a high instruction level parallelism (ILP) mode and a low ILP mode. In high ILP mode, the CPU executes wide instruction words using all operational clusters of the CPU and all of a main instruction cache and main data cache of the CPU are accessible to a high ILP task. The CPU also includes a mini-instruction cache, a mini-instruction register and a mini-data cache which are inactive during high ILP mode. An instruction level controller in the CPU receives a low ILP signal, such as an interrupt or function call to a low ILP routine, and switches to low ILP mode. In low ILP mode, the main instruction cache and main data cache are deactivated to preserve their contents. At the same time, a predetermined cluster remains active while the remaining clusters are also deactivated. The low ILP task executes instructions from the mini-instruction cache which are input to the predetermined cluster through the mini-instruction register. The mini-data cache stores operands for the low ILP task. The separate mini-instruction cache and mini-data cache along with the use of only the predetermined cluster minimizes the pollution of the main instruction and data caches, as well as pollution of register files in the deactivated clusters, with regard to a task executing in high ILP mode.

41 Claims, 7 Drawing Sheets

APPARATUS AND METHOD FOR EFFICIENT SWITCHING OF CPU MODE BETWEEN REGIONS OF HIGH INSTRUCTION LEVEL PARALLISM AND LOW INSTRUCTION LEVEL PARALLISM IN COMPUTER PROGRAMS

BACKGROUND OF THE INVENTION

1. Field of the Invention

This invention relates generally to microprocessors and more particularly to very large instruction word (VLIW) microprocessors having multiple clusters of functional units.

2. Description of the Related Art

High performance VLIW central processing units (CPUs) with multiple functional units are designed to obtain improved processing performance by executing code which has high instruction level parallelism (ILP). Clustered VLIW machines (CVLIW) further divide the CPU architecture into clusters which each contain one or more functional units and a separate register file. Instructions in the code are divided into sub-instructions which are input to each cluster and which may be executed in parallel.

FIG. 1 shows a conventional CVLIW machine 10. CVLIW 10 includes a main instruction cache 20 and a main data cache 80 which are shared by clusters 50A–D. Wide instructions within main instruction cache 20 are fed into instruction register 30 with each cluster 50A–D getting a fixed fraction, called a c-instruction, of the wide instruction. Each c-instruction is loaded into one of subregisters 30A–D for input to a corresponding cluster 50A–D. The source register operand specifiers in the instructions seen by each cluster 50A–D specify registers within one of register files 52A–D that is local to that cluster. There can be communication between clusters by movement of register contents, either with an explicit move instruction or by implicit destination cluster specifiers along with the register field.

Each cluster 50A–D contains a local register file 52A–D feeding operands to one or more local execution units 54A–D to perform an operation, i.e. an alu operation, load store, branch, etc. The results generated by the operations performed in each of the clusters 50A–D are then stored in main data cache 80.

CVLIW machines achieve high levels of performance when the ILP is high. However, these CPUs are often interrupted by tasks that are not performance critical or have low ILP. High ILP code can also make procedure or system calls to code of known low ILP. During a high ILP code sequence, all clusters 50A–D of the machine 10 are being utilized and there are many live registers in register files 52A–D. The main instruction cache 20 and data cache 80 have been primed with the necessary instructions and data operands and cache localities typically contribute to relatively fast instruction fetch and data load/store operations. However, when an interrupt or system call involving a low ILP routine occurs, then the entire width of CPU 10 is typically available to the low ILP process even though it is not useful to allocate the full width of the processor to the low ILP task.

To preserve the contents of the registers in register files 52A–D, the interrupt routine and system call will typically store the register contents at the beginning of the interrupt of system call and restore the registers upon completion. As a result, the CPU suffers the overhead of saving and restoring a large number of registers at each interruption or system call even though it is not useful to allocate the full width of CPU 10 to the low ILP process. The performance penalty is particularly important in the CVLIW class of microprocessors which have a large number of live registers distributed among multiple register files 52A–D.

Processor performance is further impacted because low ILP regions will pollute the main instruction cache 20 by overwriting instructions for the high ILP code which are resident in main instruction cache 20 so that performance is reduced when execution flow returns to the high ILP code region. Similarly, the low ILP regions can overwrite data in main data cache 80 which is needed by the high ILP regions and which must then be restored by when execution flow returns to the high ILP code region.

Conventional CPU architectures, such as the PA-RISC architecture from Hewlett-Packard (HP), have attacked the register save/restore problem by designating a subset of registers as special shadow registers with dual internal state. The low ILP code regions are limited by convention to using this subset of the total register space and register pollution is avoided. However, this technique requires the designation of privileged and non-privileged tasks and cannot be used in any non-privileged, and therefore non-trusted, tasks.

Another way that a register file save and restore can be avoided is by using a register stack as done in the PAWW processor from Hewlett-Packard (HP). However, the register stack requires the inclusion of register renaming, with an attendant increase in complexity, area and execution time in the front end of the CPU pipeline. Also, there is high overhead in supporting the virtual to physical translation required for the register stack and in supporting bounds checking and other housekeeping functions that must be included to accommodate the use of the register stack. Furthermore, register stack overflow and underflow must be provided for which results in still more code overhead and complexity.

In addition, neither the save and restore solution nor the shadow register set solution employed in conventional CPU architectures prevent pollution of the main instruction cache 20 and main data cache 80.

Accordingly, the need remains for a CPU capable of executing both high ILP and low ILP code regions without loss of performance due to pollution of registers, instruction cache and data cache.

SUMMARY OF THE INVENTION

It is, therefore, an object of the invention to provide a VLIW architecture which permits execution of a low ILP task with reduced pollution of registers in register files of operational clusters within the architecture.

Another object of the invention is to reduce the level of pollution of the contents of an instruction cache in the architecture from execution of the low ILP task.

A further object of the invention is to reduce the level of pollution of the contents of a data cache in the architecture from execution of the low ILP task.

An embodiment of a cluster VLIW architecture, according to the present invention, includes a main instruction cache configured to store instructions comprising a plurality of c-instructions, a main instruction register configured to receive an instruction for execution from the main instruction cache, and a plurality of clusters, wherein each cluster further comprises a register file and an execution unit and each cluster receives one of the c-instructions from the instruction in the main instruction register. A main data cache is coupled to the plurality of clusters and configured to store data which is accessible to the plurality of clusters. The architecture also includes a mini-instruction cache which stores c-instructions, a mini-instruction register that receives a c-instruction for execution from the mini-instruction cache, where the mini-instruction register is further coupled to a predetermined one of the plurality of clusters, and a mini-data cache that is coupled to the predetermined one of the plurality of clusters. An instruction level controller of the architecture is configured to receive a low ILP signal and generate a mode signal configured to selectively enable the main instruction cache, main instruction register, the plurality of clusters, the main data cache, the mini-instruction cache, the mini-instruction register and the mini-data cache. The instruction level controller is further configured, when the low ILP signal is absent, to activate the main instruction cache, the main data cache, the main instruction register and the plurality of clusters and deactivate the mini-instruction cache, the mini-instruction register and mini-data cache. The instruction level controller also deactivates the main instruction cache, the main instruction register, the main data cache and the plurality of clusters, except for the predetermined one of the plurality of clusters, and activates the mini-instruction cache, mini-instruction register, mini-data cache and the predetermined one of the plurality of clusters responsive to the low ILP signal.

An embodiment of a microprocessor architecture, according to the present invention, includes a main instruction cache configured to store instructions for a first task, a main instruction register configured to receive and store an instruction output from the main instruction cache, a first operational cluster configured to receive and execute the instruction stored in the main instruction register, wherein the first operational cluster further comprises a first register file and a first execution unit, and a main data cache configured to store data for the first task. The microprocessor architecture includes a mini-instruction cache configured to store instructions for a second task, a mini-instruction register configured to receive and store an instruction output from the mini-instruction cache, a second operational cluster configured to receive and execute the instruction stored in the mini-instruction register, wherein the second operational cluster further comprises a second register file and a second execution unit, and a mini-data cache configured to store data for the second task. An instruction level controller in the architecture is configured to receive an interrupt signal and, responsive thereto, switches execution from the first task to the second task by deactivating the main instruction cache, the main instruction register, the first operational cluster, and the main data cache and activating the mini-instruction cache, the mini-instruction register, the second operational cluster, and the mini-data cache.

Another embodiment of a VLIW architecture, according to the present invention, includes an instruction cache configured to store wide instruction words, wherein each wide instruction word includes a plurality of c-instructions and wherein the instruction cache includes a low ILP instruction portion, an instruction register configured to latch a wide instruction word from the instruction cache, wherein the instruction register further comprises a plurality of sub-registers, wherein each one of the plurality of sub-registers is configured to receive a corresponding one of the plurality of c-instructions in the wide instruction word from the instruction cache, a plurality of operational clusters, each one of the plurality of operational clusters being coupled to a corresponding one of the plurality of sub-registers of the instruction register, wherein each one of the plurality of operational clusters includes a register file and an execution unit, and a data cache coupled to the plurality of operational clusters and configured to store data for access by the operational clusters, where the data cache includes a low ILP data portion. The VLIW architecture includes an instruction level controller configured to selectively control each one of the plurality of operational clusters and control access to the instruction cache and the data cache, wherein the instruction level controller is further configured to receive a low ILP signal and, responsive thereto, halt execution in each one of the plurality of operational clusters excepting a predetermined one of the plurality of operational clusters and limit access of the predetermined one of the operational clusters to the low ILP instruction portion and the low ILP data portion.

An embodiment of a method for reducing cache pollution in a CPU, according to the present invention, includes providing a main instruction cache configured to store VLIW instructions, wherein each VLIW instruction is further comprised of a plurality of c-instructions, providing a plurality of operational clusters, wherein each one of the plurality of operational clusters is configured to receive one of the plurality of c-instructions of each VLIW instruction in the main instruction cache, and executing a high ILP task by loading VLIW instructions from the main instruction cache into a main instruction register for output to the plurality of clusters. The method includes receiving a low ILP signal and, responsive thereto, deactivating the main instruction cache and main instruction register, deactivating the plurality of operational clusters, except for a predetermined one of the operational clusters, activating a mini-instruction cache and a mini-instruction register, and serially executing a low ILP task by serially loading c-instructions from the mini-instruction cache into the mini-instruction cache for output to the predetermined one of the operational clusters.

Another embodiment of a method for reducing cache pollution in a VLIW machine, according to the present invention, includes providing an instruction cache configured to store long instruction words for a high ILP task, wherein each instruction word comprises a plurality of c-instructions, latching a long instruction word from the instruction cache into an instruction register, where the instruction register includes a plurality of sub-registers, each sub-register latching a corresponding c-instruction of the long instruction word from the instruction cache, and outputting each of the c-instructions latched into the instruction register to a corresponding one of a plurality of operational clusters. The method then provides for receiving a low ILP signal, halting execution of the high ILP task in the operational clusters responsive to the low ILP signal, and executing a low ILP task in a low ILP set of the operational clusters by loading c-instructions for the low ILP task from a low ILP cache portion of the instruction cache into the sub-registers of the instruction register corresponding to the operational clusters of the low ILP set.

The foregoing and other objects, features and advantages of the invention will become more readily apparent from the following detailed description of several embodiments of the invention which proceeds with reference to the accompanying drawings.

DETAILED DESCRIPTION

Figure 1:
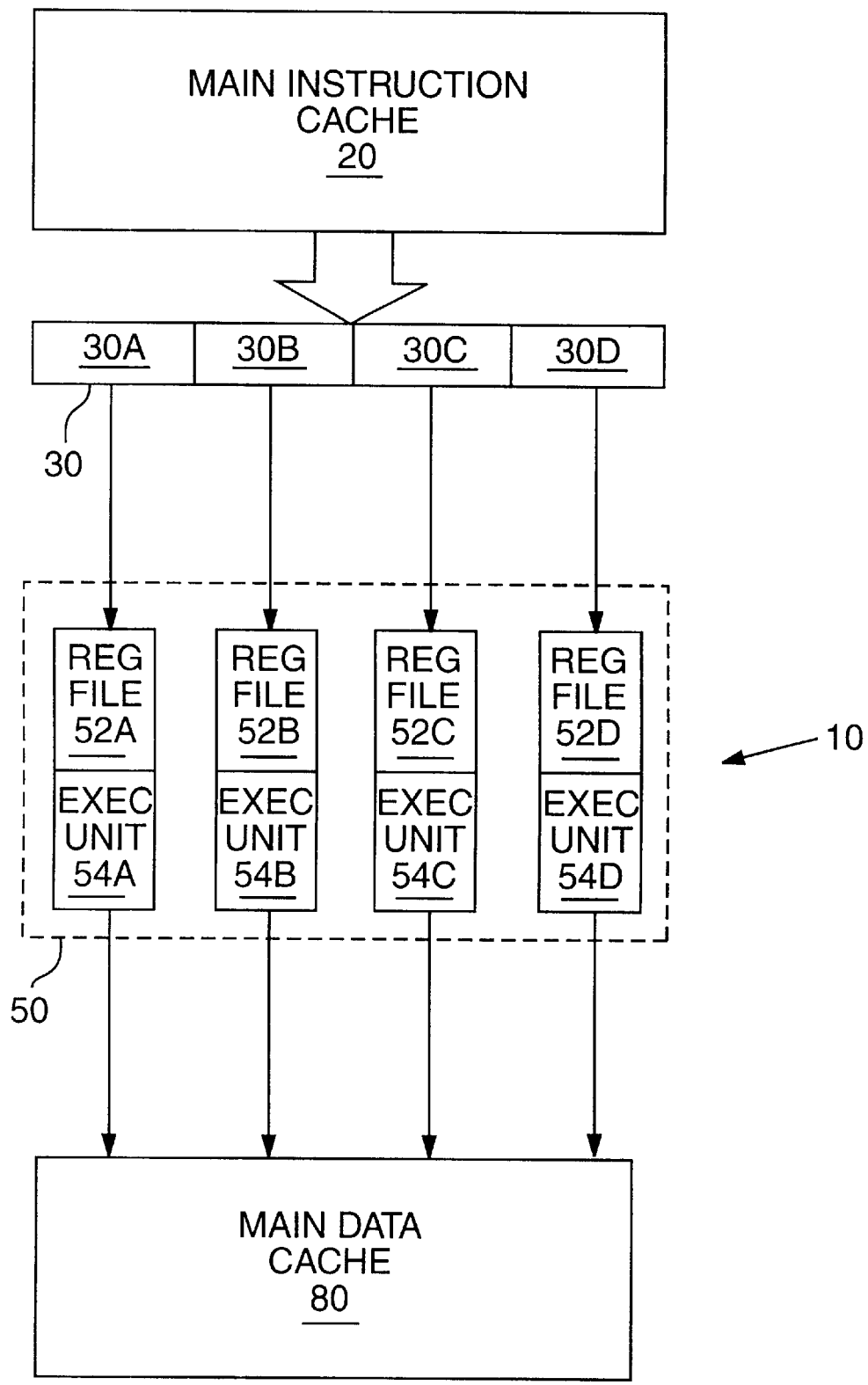
FIG. 1 is a functional block diagram of a conventional cluster architecture in a VLIW machine.
Figure 2:
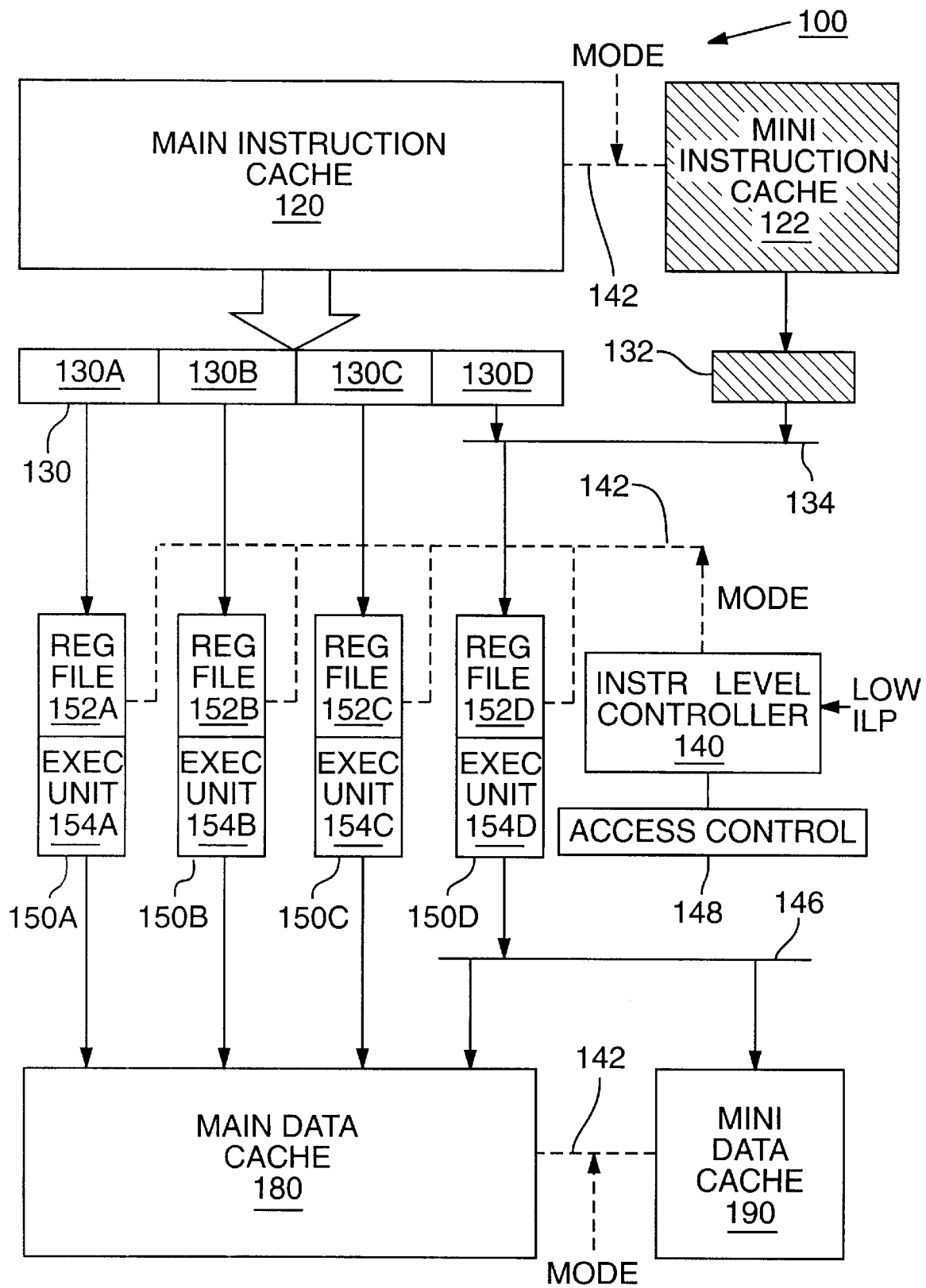
FIG. 2 is a functional block diagram of an embodiment of a cluster architecture in a VLIW machine according to the present invention operating in high ILP mode.
Figure 3:
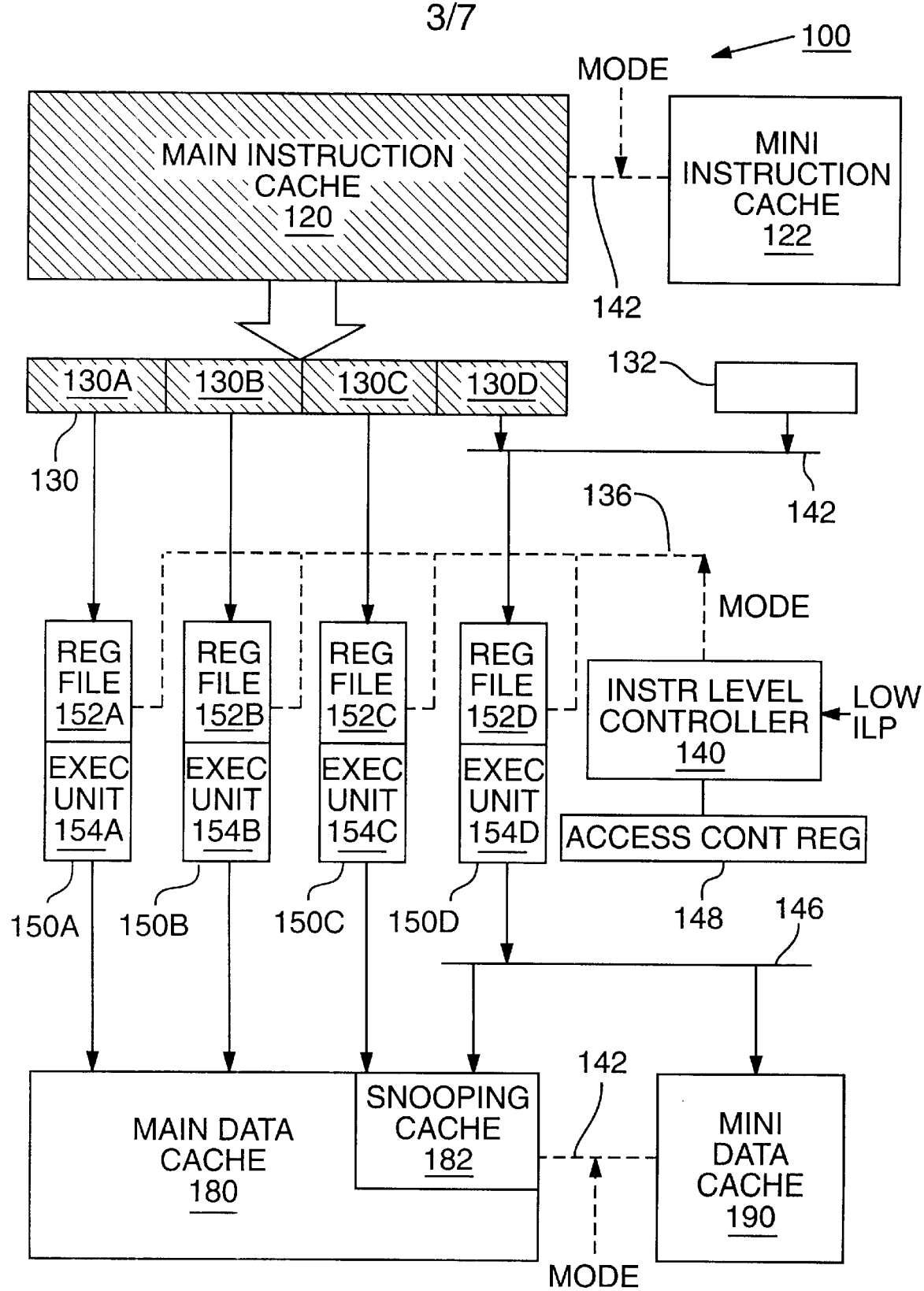
FIG. 3 is a functional block diagram of the cluster VLIW machine of FIG. 2 operating in low ILP mode.

Indicated generally at 100 in FIGS. 2 and 3 is a CPU in accordance with the present invention. Prior to describing the detailed structure of the CPU 100, the key components of the circuit will be identified followed by a brief description of the operation of the system. Then a more detailed description of each of the components will be provided along with a more detailed description of the operation. Similar reference numbers are used to identify similar components present in different drawings.

More detailed consideration will now be given to the structure of the CPU 100 of the present invention. CPU 100 includes a main instruction cache 120 which stores wide instruction words which are loaded into an instruction register 130 which has sub-registers 130A–D which each receive a c-instruction for each wide instruction in instruction cache 120. Each of sub-registers 130A–D is coupled to a corresponding cluster 150A–D which executes the c-instruction stored in the sub-register. The results of the operation performed in each cluster 150A–D is stored in a main data cache 180.

In addition, CPU 100 includes a mini-instruction cache 122, a mini-instruction register 132 and a mini data cache 190. Sub-register 130D and mini-instruction register 132 are coupled to the input of cluster 150D via an instruction bus 134. Instruction level controller 140 selectively enables either sub-register 130D of main instruction register 130 or mini-instruction register 132 to input c-instructions to cluster 150D. Likewise, data bus 146 couples both main data cache 180 or mini-data cache 190 to cluster a data port of 150D. Instruction level controller 140 selectively enables either main data cache 180 or mini-data cache 190 to cluster 150D. Alternatively, busses 134 and 146 can be replaced with a switch, multiplexor or similar device under the control of instruction level controller 140 in order to control instruction and data transfer to the predetermined low ILP cluster 150D.

A mode control bus 142 driven by instruction level controller 140 is coupled to main instruction cache 120, mini-instruction cache 122, clusters 150A–D, main data cache 180 and mini-data cache 190 and which selectively activates and deactivates these devices using a MODE signal. The architecture of CPU 100 could alternatively employ separate control signal to control the function of the individual components of the architecture.

More detailed consideration will now be given to the operation of the present invention. In a high ILP code section, a wide instruction consisting of multiple c-instructions is dispatched from the main instruction cache 120 to the main instruction register 130, where the wide instruction contains one c-instruction per cluster 150A–D.

The instruction level controller 140 generates a value for the MODE control signal which selectively disables mini-instruction cache 122, mini-instruction register 132 and mini-data cache 190 and enables main instruction cache 120, instruction register 130 and main data cache 180. High ILP mode is illustrated in FIG. 2 wherein the inactive devices are shown as shaded.

The instruction level controller 140 switches to a low ILP mode upon receiving a LOW ILP mode signal, such as an interrupt, a procedure call instruction designated as a low ILP call, or a predetermined "gateway" instruction executed by the CPU 100. The low ILP mode signal is received by the instruction level controller 140 which responds by generating a value for the MODE control signal which inactivates the main instruction cache 120, main instruction register 130, main data cache 180 and clusters 150A–C. The MODE control signal from instruction level controller 140 also activates the mini-instruction cache 120, mini-data cache 190 in order to couple cluster 150D to the mini-instruction cache 122 and mini-data cache 190, respectively. The instruction level controller 140 also performs a register store of the registers within register file 152D for later restoration at the completion of the low ILP task. The low ILP mode is illustrated in FIG. 3 where the inactive devices are shown as shaded.

As indicated above, there are two alternative ways in which the CPU 100 can be constructed to switch between instruction modes. The first alternative involves the execution of a switching instruction by CPU 100. The switching instruction is inserted into the software code when the user explicitly identifies a low ILP code region or a high ILP code region. This is typically accomplished using a compiler which will insert the mode switch instruction into a single thread of executable code responsive to the user's directives. Thus, the value of the LOW ILP signal is determined by the execution of the switching instruction.

The second alternative way of switching between low and high ILP modes is in response to an interrupt received by CPU 100. In this alternative, the value of the LOW ILP signal is determined by the reception of an interrupt signal input to CPU 100. In response to the interrupt signal, the operating system of CPU 100 determines whether execution is switching to a low ILP process. The ILP mode of the process corresponding to the interrupt received is set up at process creation and can be stored in the process tables of the operating system of CPU 100.

In either of the alternatives discussed above, the default ILP mode setting for a process must be coherent with the compiler switches that the user adopts when compiling the code for the process. Subroutines that are shared among processes having different ILP modes must be either compile into versions for each ILP mode or compiled for the most conservative ILP mode, i.e. the lowest ILP mode available.

In the low ILP mode, only cluster 150D receives c-instructions. Clusters 150A–C remain untouched, namely the content of the registers in their corresponding register files 150A–C are not disturbed and, consequently, no save/restore operation is necessary for the registers. Alternatively, the register contents of register file 152D can be saved by performing a caller/callee save, a small shadow register set within register file 152D or other register contents saving methods available in conventional machines.

In the compilation of low ILP mode code, the c-instructions in each wide instruction of the low ILP task are split and serialized for input to active cluster 150D. The c-instructions for the low ILP task are stored and fetched from the separate, generally smaller, mini-instruction cache 122. The instructions belonging to the high ILP code resident in the main instruction cache 120 are therefore not displaced by the instructions for the low ILP task.

In addition, data load/stores for the low ILP task occur in the separate mini-data cache 190. If the main data cache 180 is not a write-through cache, then a portion of the main data cache, a snooping cache 182, remains active during low ILP mode and snoops on the data load/stores between cluster 150D and mini-data cache 190 of the low ILP task and supplies, updates or invalidates the cache data in main data cache 180 in the instances where the low ILP task accesses the same data as the high ILP task in order to maintain concurrency of the cache data.

One approach is to compile code having different levels of ILP such that only the desired units of CPU 100 are referenced by the code leaving the other units dormant. Using the example of CPU 100 in FIGS. 2 and 3, the high ILP code is compiled to reference main instruction cache 120, clusters 150A–D and main data cache 180 without references to mini-instruction cache 122 or mini-data cache 190 which remain dormant, as illustrated in FIG. 2. Conversely, the low ILP code is compiled to reference mini-instruction cache 122, cluster 150D and mini-data cache 190 without references to main instruction cache 120, clusters 150A–C or main data cache 180 which remain dormant, as illustrated in FIG. 3. Memory accesses will follow the units that are active during a given process. This can be thought of as being performed by a multiplexor at the interface between the clusters 150A–D and the main instruction cache 120 and mini-instruction cache 122 and another multiplexor at the interface between clusters 150A–D and the main data cache 180 and mini-data cache 190. The dormant units can be powered down to conserve power and if the time required for the power-down operation and subsequent power-up operation is acceptable to the operation of CPU 100.

There are several approaches that can be taken with regard to access to data in the inactive clusters, i.e. clusters 150A–C in FIG. 3, by the predetermined low ILP cluster, cluster 150D in FIG. 3, active during low ILP tasks. One approach is to limit the low ILP instructions issued to the live cluster 150D to access only registers in register file 152D of the live cluster 150D. Attempts by instructions executing within cluster 150D to read or write registers on one of the remote clusters 150A–C are ignored or trapped.

This can be obtained through logic circuitry or in the compiler used to generate the code. The compiler knows, through mode switch instructions or directives input by the user, the ILP mode of the currently compiling routine and will limit the registers accessed by the code to only those registers allowed under the particular ILP mode. References in the routine to registers that are not allowed will be flagged by the compiler as errors. In this approach, a "caller saves" convention is adopted wherein the caller routine saves each register that is uses before calling the routine with a different ILP mode.

However, if the ILP mode change occurs during interrupt processing, the "caller saves" convention cannot be performed unless the CPU hardware implements it because there is no software identifiable caller routine. Thus, a "callee saves" protocol is preferrable. The operating system of CPU 100 will know the ILP mode of both the interrupted task and the interrupting task and will perform the register saves and restores that are appropriate for the tasks involved.

Another approach is to permit the low ILP task to have read access to registers in inactive clusters to allow the low ILP task to have access to data from the high ILP task or global resources, but to prohibit, either through compiler rules or hardware logic, write operations to registers within the inactive clusters or the inactive or restricted portions of the main data cache.

Yet another approach is to provide for a control register 148 whose bits define the access permissions for the registers in the non-live clusters 150A–C. The high ILP task defines the values of the control register bits that specifically allow or disallow reading or writing of remote cluster registers in registers files 152A–C. This allows the high ILP code to allow access to registers for selected called procedures that are known to be stable. Access control can be provided on a per cluster basis as well.

Figure 4:
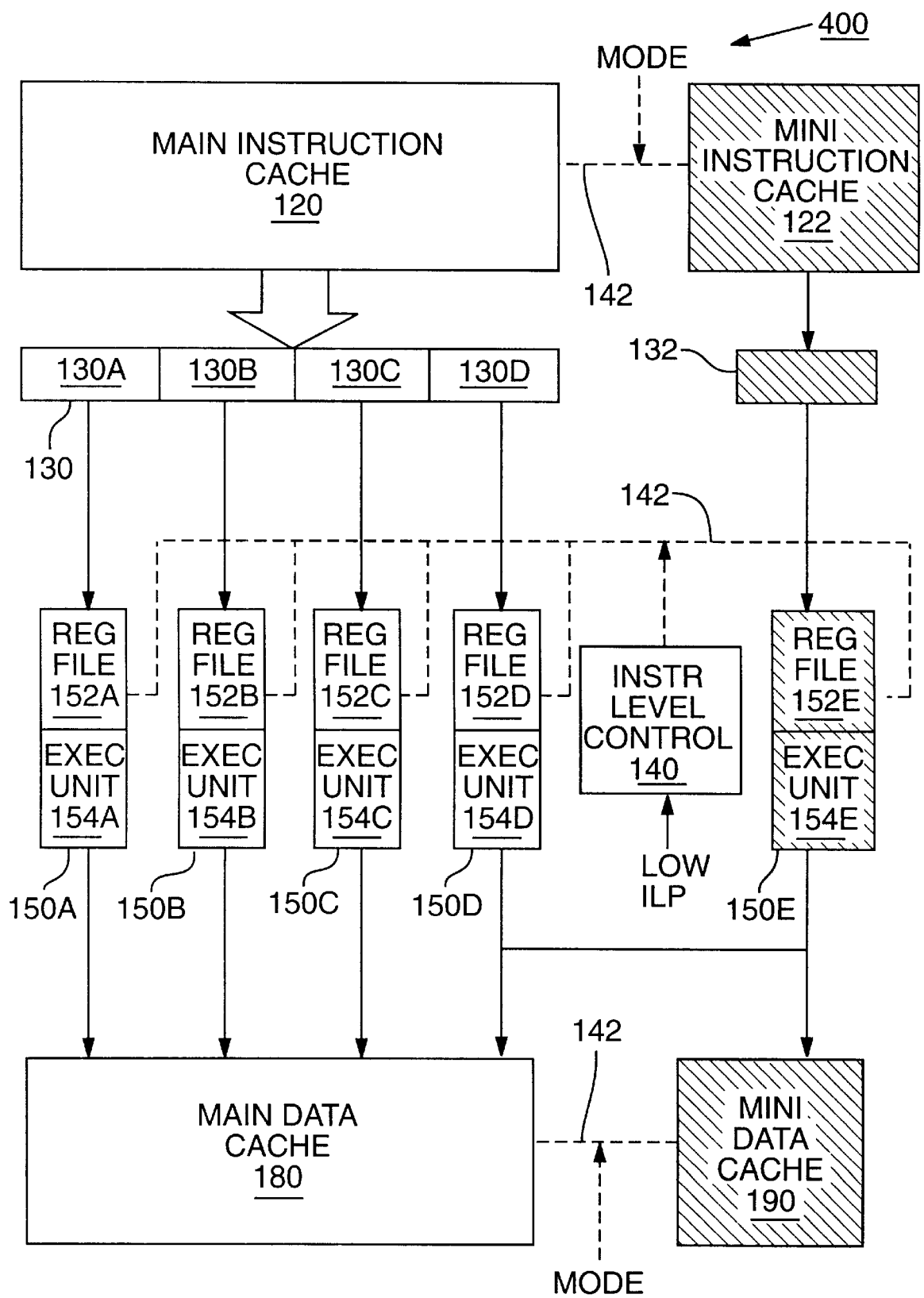
FIG. 4 is a functional block diagram of another embodiment of a cluster architecture in a VLIW machine according to the present invention operating in high ILP mode.
Figure 5:
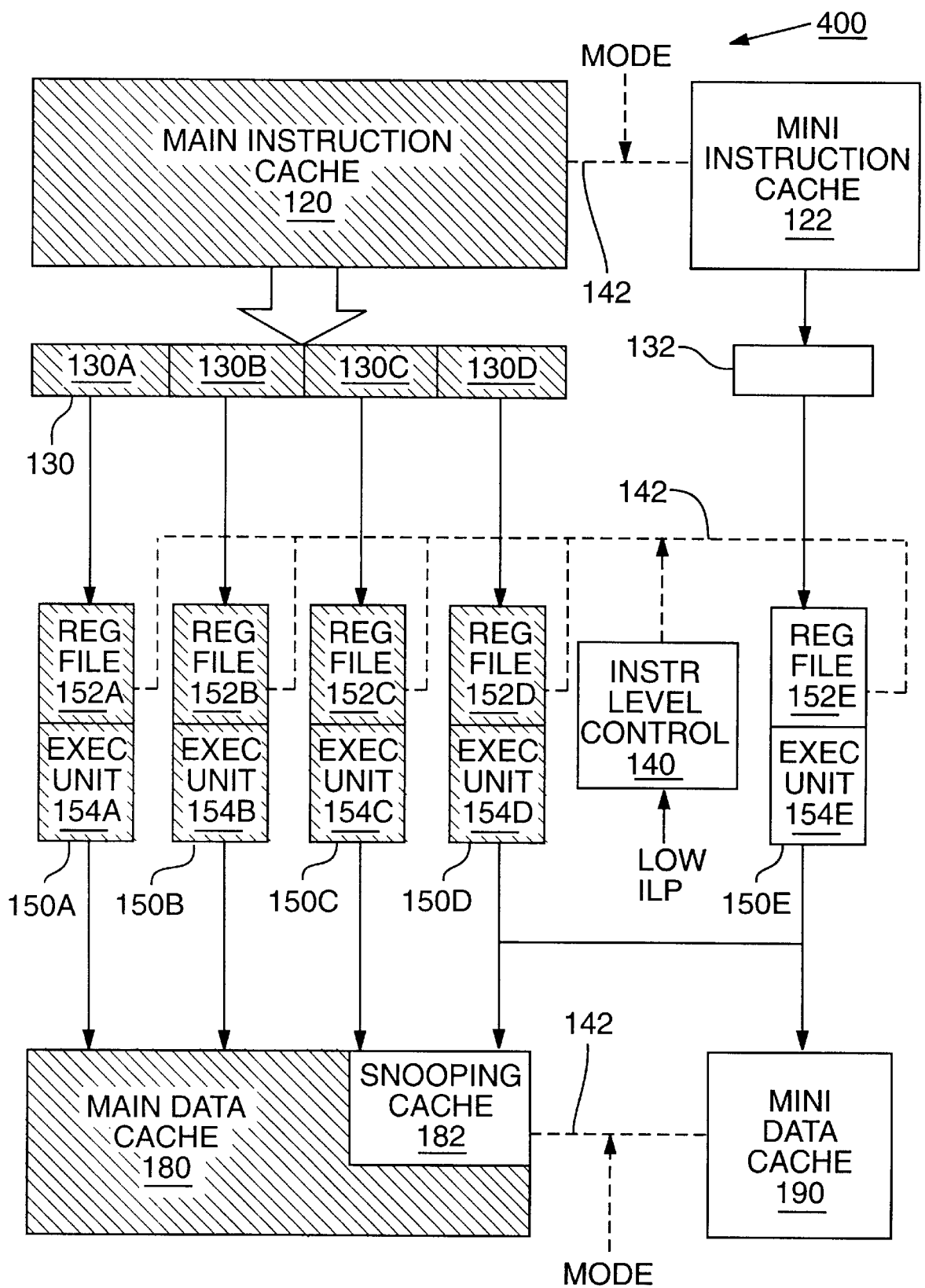
FIG. 5 is a functional block diagram of the cluster VLIW machine of FIG. 4 operating in low ILP mode.

FIGS. 4 and 5 illustrate another embodiment of a CPU 400 according to the present invention which utilizes a dedicated interrupt processing cluster 150E. The dedicated interrupt processing cluster 150E includes a register file 152E and functional unit 154E. Cluster 150E is coupled to mode control bus 142 and receives the mode control signal from instruction level controller 140. When CPU 400 is in high ILP mode, illustrated in FIG. 4, cluster 150E executes no instructions and instruction level controller 140 deactivates mini-instruction 122, mini-instruction register 132, cluster 150E and mini-data cache 190.

When the instruction level controller 140 receives the LOW ILP signal, then the controller will output a low ILP value for the MODE signal. During low ILP mode, illustrated in FIG. 5, cluster 150E is the only execution resource that executes instructions and clusters 150A–D are inactive. Instructions for cluster 150E are stored in mini-instruction cache 122 and are fed into cluster 150E via mini-instruction register 132. Operational results are output to mini-data cache 190. A snooping cache 182 can be employed to update data in the main data cache 180 responsive to data modifications executed by the low ILP task. As in the CPU 100 of FIGS. 2 and 3, the architecture of CPU 400 of FIGS. 4 and 5 can be adapted to provide for the low ILP cluster 150E to have access to the contents of registers in register files 152A–D and which can include an access control register.

Figure 6:
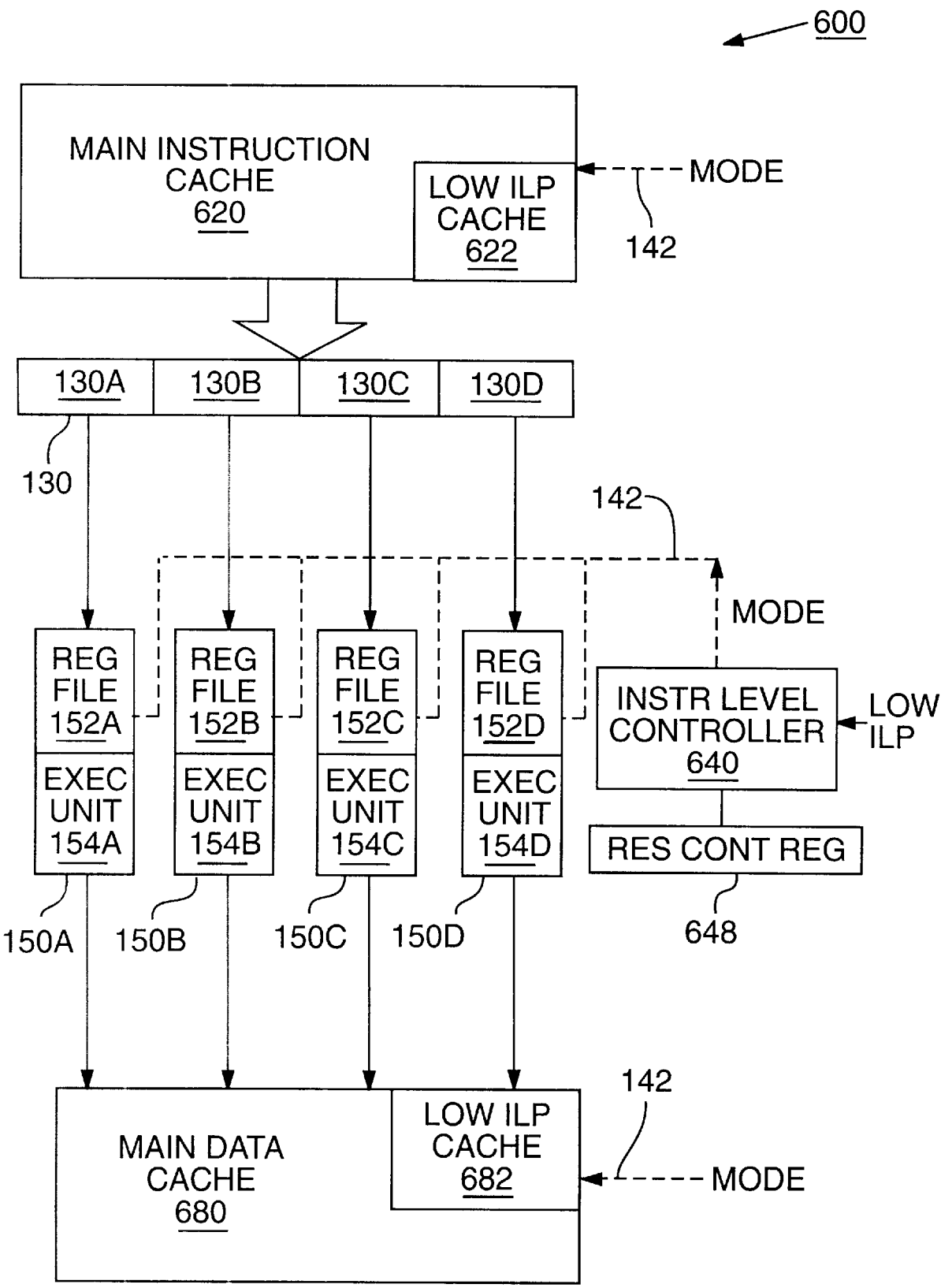
FIG. 6 is a functional block diagram of yet another embodiment of a cluster architecture in a VLIW machine according to the present invention operating in high ILP mode.
Figure 7:
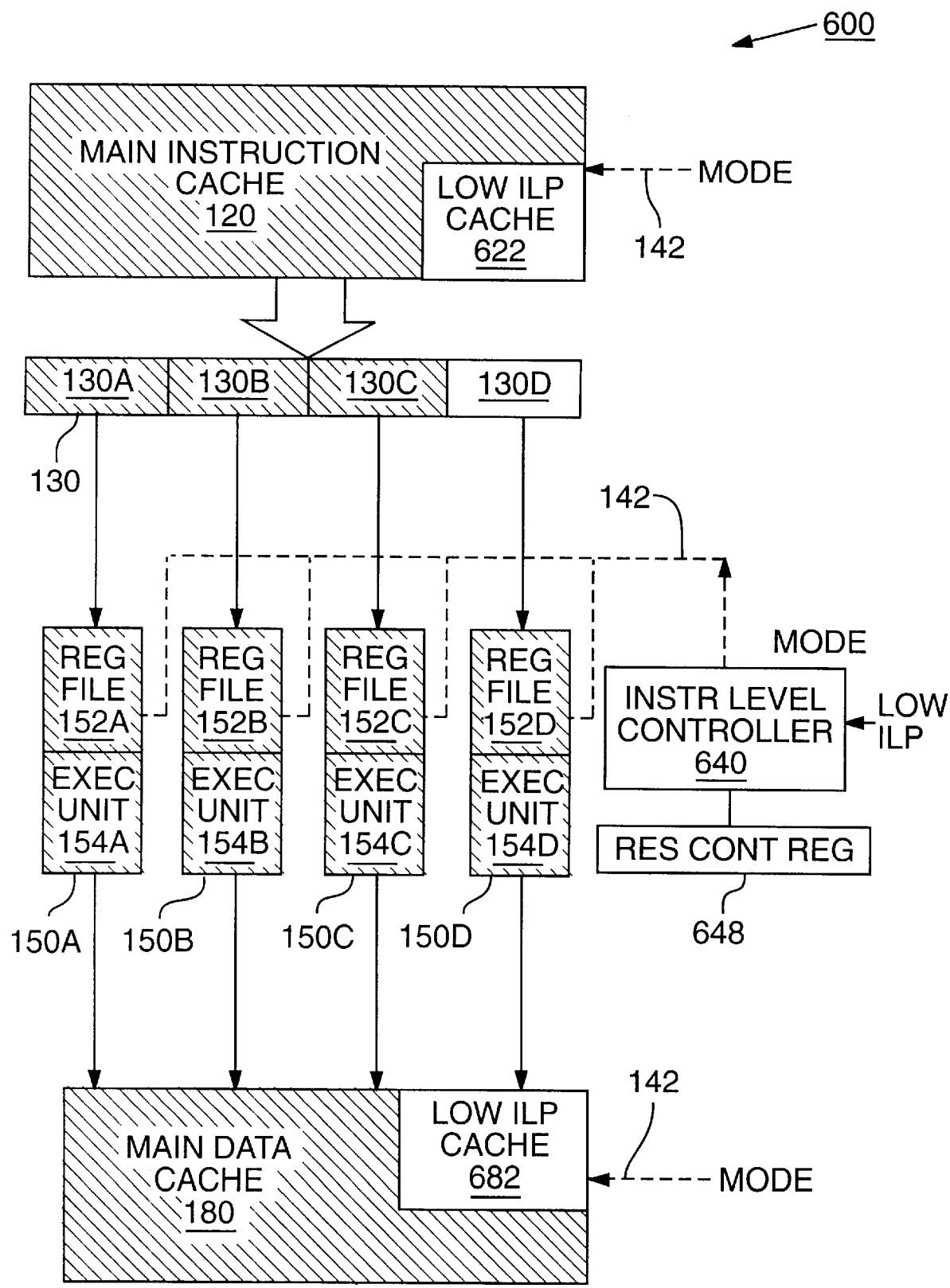
FIG. 7 is a functional block diagram of the cluster VLIW machine of FIG. 6 operating in low ILP mode.

Another embodiment of a CPU 600 according to the present invention is shown in FIGS. 6 and 7. In CPU 600, main instruction cache 620 includes a low ILP portion 622 which is active during high ILP mode but which is configured to remain active during a low ILP mode when the remainder of main instruction cache 620 is deactivated under control of the MODE signal generated by instruction level controller 640. If main instruction cache 620 is a set associative cache, then low ILP portion 622 is one set of the cache. In the execution of a low ILP task, as misses occur and cache lines need to be filled in, the instruction level controller 640 ensures that the low ILP instructions are only inserted in the low ILP set 622. If main instruction cache 620 is a direct mapped cache, or even if it is a single set associative cache, then the low ILP task can be restricted to access to a subset 622 of the rows of the main cache 620. This can be achieved by constructing the row decoders for main cache 620 to operate with fewer bits from the instruction address when CPU 600 is operating in low ILP mode, as shown in FIG. 7. The instruction address bits that are decoded by the row decoders in main cache 620 are still required to perform the tag check for the cache. Thus, a tag array in main cache 620 requires that additional bits be stored which are ignored in high ILP mode and participate in tag checks only in low ILP mode.

Similarly, main data cache 680 includes a low ILP portion 682 which is active during low ILP mode while the remainder of main data cache 680 is deactivated under control of the MODE signal generated by the instruction level controller 640. However, the low ILP task may access data which is dirty (i.e. modified) in the main data cache 680. If main data cache 680 is a write through cache, then there will not be dirty data in the main cache. If main data cache 680 is a write-back cache, then the low ILP data cache 68 will also have to snoop on the data accesses of the low ILP task and provide the dirty data from the remaining portion of the main data cache 680 to the low ILP code. Similarly, the low ILP task may write data in the low ILP portion 682 that also resides in the remaining portion of main data cache 680. In this case, the low ILP portion 682 will also have to update or invalidate the copy of the data in main data cache 680.

CPU 600 of the present invention also includes a resource control register 648 which specifies varying levels of resource allocation in low ILP mode. Using resource control register 648, different low ILP tasks can be allocated different levels of resources in CPU 600. For instance, the binary number stored in resource control register 648 with the value 0 represents the lowest ILP wherein only cluster 150D is allocated to a low ILP task. A binary value of all 1's in the resource control register 648, on the other hand, represents a high level of ILP where all of clusters 150A–D are allocated to the task. Intermediate values in resource control register 648 represent intermediate degrees of ILP and essentially allow the resources of CPU 600 to be tailored to the performance requirements of the lower ILP tasks, but at the expense of greater pollution of the architectural and microarchitectural state of the high ILP code.

The resource control register 648 includes separate fields which control the usage of various resource types within CPU 600. For example, one field controls the allocation of registers within register files 152A–D, another field controls the allocation of clusters 150A–D, yet another field controls the portion 622 of main instruction cache 620 allocated to a low ILP task, and still another field controls the portion 682 of the main data cache 680 allocated to the low ILP task.

The value in resource control register 648 causes the instruction level controller 640 to generate an appropriate value for the MODE signal to control the components of CPU 600 and selectively inactivate components based upon the value in the resource control register 648. By way of example, if resource control register 648 has a three bit field for usage of clusters 150A–D, then a value of 1 specifies that only one cluster is to be used by the low ILP task. On the other hand, a value of 4 in the cluster field allocates all four of clusters 150A–D to the low ILP task. Similarly, a value of one for a register usage field within resource control register 648 specifies that one eighth of the registers in register files 152A–D on the active ones of clusters 150A–D are to be available to the low ILP code whereas a value of four specifies that one half of the registers are to be available. Again, a value of one in an instruction cache field of resource control register 648 specifies that one thirty-secondth of the main instruction cache 620 is to be available to the low ILP code, while a value of four specifies that one eighth of the main instruction cache 620 is available. This scheme can be extended to the main data cache 680 as well.

Note that in the cases where architectural resources, such as registers and clusters, are specified in this manner, the instructions in the low ILP task have to be adapted to operate with the resources allocated to the procedure. In cases where microarchitectural resources, such as the portion 622 of main instruction cache 620 and the portion 682 of main data cache 680 available to the low ILP task, are variably allocated, the low ILP task does not have to be adapted to the resources available. The low ILP task will simply execute at lower or higher speeds depending upon the resources made available to the low ILP task by the high ILP code throughout the value stored in the resource control register 648.

Having described and illustrated the principles of the invention in a preferred embodiment thereof, it should be apparent that the invention can be modified in arrangement and detail without departing from such principles. I claim all modifications and variations coming within the spirit and scope of the following claims.

We claims:

1. A cluster VLIW architecture, the architecture comprising:

a main instruction cache configured to store instructions, each instruction further comprising a plurality of c-instructions;

a main instruction register coupled to the main instruction cache and configured to receive an instruction for execution from the main instruction cache;

a plurality of clusters, wherein each cluster further comprises a register file and an execution unit and each cluster is configured to receive one of the plurality of c-instructions from the instruction for execution in the main instruction register;

a main data cache coupled to the plurality of clusters and configured to store data which is accessible to the plurality of clusters;

a mini-instruction cache configured to store c-instructions;

a mini-instruction register coupled to the mini-instruction cache and configured to receive a c-instruction for execution from the mini-instruction cache, wherein the mini-instruction register is further coupled to a predetermined one of the plurality of clusters;

a mini-data cache coupled to the predetermined one of the plurality of clusters; and an instruction level controller configured to receive a low ILP signal and generate a mode signal configured to selectively enable the main instruction cache, main instruction register, the plurality of clusters, the main data cache, the mini-instruction cache, the mini-instruction register and the mini-data cache, the instruction level controller being further configured, when the low ILP signal is absent, to activate the main instruction cache, the main data cache, the main instruction register and the plurality of clusters and deactivate the mini-instruction cache, the mini-instruction register and mini-data cache, and wherein the instruction level controller deactivates the main instruction cache, the main instruction register, the main data cache and the plurality of clusters, except for the predetermined one of the plurality of clusters, and activates the mini-instruction cache, mini-instruction register, mini-data cache and the predetermined one of the plurality of clusters responsive to the low ILP signal.

2. The architecture of claim 1, wherein the main data cache further includes a snooping cache coupled to the predetermined one of the clusters, the snooping cache being configured to monitor data accesses of the predetermined one of the plurality of clusters to the mini-data cache.

3. The architecture of claim 1, the architecture further including an access control register coupled to the instruction level controller, wherein the predetermined one of the clusters has access to registers in the other ones of the plurality of clusters and where the access to registers in the other ones of the plurality of clusters is limited by the instruction level controller based upon a value stored in the access control register.

4. The architecture of claim 1, the architecture further including a resource control register coupled to the instruction level controller, wherein the instruction level controller is configured to activate a number of clusters of the plurality of clusters responsive to the low ILP signal, wherein the number of clusters corresponds to a value stored in a cluster activation field of the resource control register.

5. The architecture of claim 4, wherein a high ILP task determines the value in the cluster activation field of the resource control register.

6. The architecture of claim 1, the architecture further including a resource control register coupled to the instruction level controller, wherein the instruction level controller is configured to maintain a portion of the main instruction cache in an activated state responsive to the low ILP signal, wherein the size of the active portion of the main instruction cache corresponds to a value stored in an instruction cache field of the resource control register.

7. The architecture of claim 6, wherein a high ILP task determines the value in the instruction cache field of the resource control register.

8. The architecture of claim 1, the architecture further including a resource control register coupled to the instruction level controller, wherein the instruction level controller is configured to maintain a portion of the main data cache in an activated state responsive to the low ILP signal, wherein the size of the active portion of the main data cache corresponds to a value stored in a data cache field of the resource control register.

9. The architecture of claim 8, wherein a high ILP task determines the value in the data cache field of the resource control register.

10. A microprocessor architecture, the architecture comprising:
    a main instruction cache configured to store instructions for a first task;
    a main instruction register configured to receive and store an instruction output from the main instruction cache;
    a first operational cluster configured to receive and execute the instruction stored in the main instruction register, wherein the first operational cluster further comprises a first register file and a first execution unit;
    a main data cache configured to store data for the first task;
    a mini-instruction cache configured to store instruction for a second task;
    a mini-instruction register configured to receive and store an instruction output from the mini-instruction cache;
    a second operational cluster configured to receive and execute the instruction stored in the mini-instruction register, wherein the second operational cluster further comprises a second register file and a second execution unit;
    a mini-data cache configured to store data for the second task; and
    an instruction level controller configured to receive an interrupt signal and, responsive thereto, switch execution from the first task to the second task by deactivating the main instruction cache, the main instruction register, the first operational cluster, and the main data cache and activating the mini-instruction cache, the mini-instruction register, the second operational cluster, and the mini-data cache.

11. The microprocessor architecture of claim 10, wherein the main data cache includes a snooping cache configured to monitor data accesses between the second operational cluster and the mini-data cache in order to maintain the concurrency of the main data cache.

12. A VLIW architecture, the architecture comprising:
    an instruction cache configured to store wide instruction words, wherein each wide instruction word includes a plurality of c-instructions and wherein the instruction cache includes a low ILP instruction portion;
    an instruction register configured to latch a wide instruction word from the instruction cache, wherein the instruction register further comprises a plurality of sub-registers, wherein each one of the plurality of sub-registers is configured to receive a corresponding one of the plurality of c-instructions in the wide instruction word from the instruction cache;
    a plurality of operational clusters, each one of the plurality of operational clusters being coupled to a corresponding one of the plurality of sub-registers of the instruction register, wherein each one of the plurality of operational clusters includes a register file and an execution unit;
    a data cache coupled to the plurality of operational clusters and configured to store data for access by the operational clusters, where the data cache includes a low ILP data portion; and
    an instruction level controller configured to selectively control each one of the plurality of operational clusters and control access to the instruction cache and the data cache, wherein the instruction level controller is further configured to receive a low ILP signal and, responsive thereto, halt execution in each one of the plurality of operational clusters excepting a predetermined one of the plurality of operational clusters and limit access of the predetermined one of the operational clusters to the low ILP instruction portion and the low ILP data portion.

13. The VLIW architecture of claim 12, the architecture further including a resource control register coupled to the instruction level controller, wherein the instruction level controller is further configured to halt execution, responsive to the low ILP signal, in a number of operational clusters of the plurality of operational clusters, the number of operational clusters corresponding to a value stored in a cluster field of the resource control register.

14. The VLIW architecture of claim 13, wherein the value stored in the cluster field of the resource control register is determined by a task running in the absence of the low ILP signal.

15. The VLIW architecture of claim 12, the architecture further including a resource control register coupled to the instruction level controller, wherein the instruction level controller is further configured to vary the size of the instruction cache portion in the instruction cache to correspond to a value stored in an instruction cache field of the resource control register.

16. The VLIW architecture of claim 15, wherein the value stored in the instruction cache field of the resource control register is determined by a task running in the absence of the low ILP signal.

17. The VLIW architecture of claim 12, the architecture further including a resource control register coupled to the instruction level controller, wherein the instruction level controller is further configured to vary the size of the low ILP data portion in the data cache to correspond to a value stored in a data cache field of the resource control register.

18. The VLIW architecture of claim 17, wherein the value stored in the data cache field of the resource control register is determined by a task running in the absence of the low ILP signal.

19. The VLIW architecture of claim 12, the architecture further including an access control register coupled to the instruction level controller, wherein the instruction level controller is further configured to control access by the predetermined one of the plurality of operational clusters to registers in the register files of the halted operational clusters according to a value stored in the access control register.

20. The VLIW architecture of claim 19, wherein the value stored in the access control register is determined by a task running in the absence of the low ILP signal.

21. A method for reducing cache pollution in a CPU, the method comprising:
   providing a main instruction cache configured to store VLIW instructions, wherein each VLIW instruction is further comprised of a plurality of c-instructions;
   providing a plurality of operational clusters, wherein each one of the plurality of operational clusters is configured to receive one of the plurality of c-instructions of each VLIW instruction in the main instruction cache;
   executing a high ILP task by loading VLIW instructions from the main instruction cache into a main instruction register for output to the plurality of clusters;
   receiving a low ILP signal;
   deactivating the main instruction cache and main instruction register responsive to the low ILP signal;
   deactivating the plurality of operational clusters, except for a predetermined one of the operational clusters, responsive to the low ILP signal;
   activating a mini-instruction cache and a mini-instruction register responsive to the low ILP signal; and
   serially executing a low ILP task by serially loading c-instructions from the mini-instruction cache into the mini-instruction cache for output to the predetermined one of the operational clusters.

22. The method of claim 21, further including the steps:
   deactivating a main data cache responsive to the low ILP signal; and
   activating a mini-data cache coupled to the predetermined one of the operational clusters responsive to the low ILP signal.

23. The method of claim 21, further including the step of allowing access to registers in the inactive operational clusters by the low ILP task based upon a value stored in an access control register.

24. The method of claim 23, further including determining the value in the access control register during the high ILP task.

25. The method of claim 21, further including the step of executing the low ILP task in a variable number of operational clusters, where the variable number of operational clusters corresponds to a value in a resource control register.

26. The method of claim 25, further including the step of determining the value in the resource control register during the high ILP task.

27. The method of claim 21, further including the step of allowing access to a portion of the main instruction cache by the low ILP task wherein the size of the portion of the main instruction cache is proportional to a value stored in a resource control register.

28. The method of claim 27, further including determining the value in the resource control register during the high ILP task.

29. The method of claim 21, further including the step of allowing access to a portion of the main data cache by the low ILP task wherein the size of the portion of the main data cache is proportional to a value stored in a resource control register.

30. The method of claim 29, further including determining the value in the resource control register during the high ILP task.

31. A method for reducing cache pollution in a VLIW machine, the method comprising:
   providing an instruction cache configured to store long instruction words for a high ILP task, wherein each instruction word comprises a plurality of c-instructions;
   latching a long instruction word from the instruction cache into an instruction register, where the instruction register includes a plurality of sub-registers, each sub-register latching a corresponding c-instruction of the long instruction word from the instruction cache;
   outputting each of the c-instructions latched into the instruction register to a corresponding one of a plurality of operational clusters;
   receiving a low ILP signal;
   halting execution of the high ILP task in the operational clusters responsive to the low ILP signal;
   executing a low ILP task in a low ILP set of the operational clusters by loading c-instructions for the low ILP task from a low ILP cache portion of the instruction cache into the sub-registers of the instruction register corresponding to the operational clusters of the low ILP set.

32. The method of claim 31, the method further including the step of determining a number of operational clusters in the low ILP set from a cluster value stored in a resource control register.

33. The method of claim 32, including the step of storing the cluster value in the resource control register during the high ILP task.

34. The method of claim 31, the method further including the step of determining a size of the low ILP portion of the instruction cache from an instruction cache value stored in a resource control register.

35. The method of claim 34, including the step of storing the instruction cache value in the resource control register during the high ILP task.

36. The method of claim 31, the method further including the steps:
   providing a data cache configured to store data for access by the plurality of operational clusters; and
   limiting access to the data cache to a low ILP data cache portion of the data cache responsive to the low ILP signal.

37. The method of claim 36, the method further including the step of determining a size of the low ILP data cache portion of the data cache from a data cache value stored in a resource control register.

38. The method of claim 37, including the step of storing the data cache value in the resource control register during the high ILP task.

39. The method of claim 31, the method further including the step of limiting access to registers in register files of operational clusters not within the low ILP set responsive to the low ILP signal.

40. The method of claim 39, the step of limiting access to registers in register files of operational cluster not within the low ILP set further includes determining the registers accessible during the low ILP task based upon a value stored in an access control register.

41. The method of claim 40, including the step of storing the value in the access control register during the high ILP task.

* * * * *